United States Patent
Yu et al.

(10) Patent No.: US 11,984,110 B2
(45) Date of Patent: May 14, 2024

(54) HETEROGENEOUS COMPUTING FOR HYBRID ACOUSTIC ECHO CANCELLATION

(71) Applicant: MediaTek Singapore Pte. Ltd., Singapore (SG)

(72) Inventors: Xiaoxi Yu, Singapore (SG); Hantao Huang, Singapore (SG); Ziang Yang, Singapore (SG); Chia Hsin Yang, Hsinchu (TW); Li-Wei Cheng, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 296 days.

(21) Appl. No.: 17/688,600

(22) Filed: Mar. 7, 2022

(65) Prior Publication Data
US 2023/0282197 A1    Sep. 7, 2023

(51) Int. Cl.
*G10K 11/178* (2006.01)
*G06F 17/14* (2006.01)
*G06N 3/045* (2023.01)

(52) U.S. Cl.
CPC ...... *G10K 11/17854* (2018.01); *G06F 17/142* (2013.01); *G06N 3/045* (2023.01); *G10K 11/17821* (2018.01)

(58) Field of Classification Search
CPC ....... G10K 11/17854; G10K 11/17821; G06N 3/045; G06F 17/14
See application file for complete search history.

(56) References Cited

U.S. PATENT DOCUMENTS

| 11,330,378 B1 * | 5/2022 | Jelčicová et al. ... H04R 25/507 |
| 11,875,810 B1 * | 1/2024 | Helwani ............... H04M 9/082 |

(Continued)

FOREIGN PATENT DOCUMENTS

| CN | 107483761 A | * 12/2017 | ............ H04M 9/082 |
| CN | 110211602 B | 9/2021 | |

(Continued)

OTHER PUBLICATIONS

Halimeh et al., "Combining adaptive filtering and complex-valued deep postfiltering for acoustic echo cancellation", 2021; ICASSP 2021 (Year: 2021).*

(Continued)

*Primary Examiner* — David L Ton
(74) *Attorney, Agent, or Firm* — Tong J. Lee (57) ABSTRACT

A device operates to perform acoustic echo cancellation. The device includes a speaker to output a far-end signal at the device, a microphone to receive at least a near-end signal and the far-end signal from the speaker to produce a microphone output, and an AI accelerator operative to perform neural network operations according to a first neural network model and a second neural network model to output an echo-suppressed signal. The device further includes a digital signal processing (DSP) unit. The DSP unit is operative to perform adaptive filtering to remove at least a portion of the far-end signal from the microphone output to generate a filtered near-end signal, and perform Fast Fourier Transform (FFT) and inverse FFT (IFFT) to generate input to the first neural network model and the second neural network model, respectively.

20 Claims, 5 Drawing Sheets

(56) References Cited

U.S. PATENT DOCUMENTS

| | | | | |
|---|---|---|---|---|
| 2009/0089054 | A1* | 4/2009 | Wang | H04M 9/082 |
| | | | | 704/E15.039 |
| 2019/0122685 | A1* | 4/2019 | Defraene | G06N 20/00 |
| 2019/0349471 | A1* | 11/2019 | Ferguson | H04M 3/568 |
| 2020/0312346 | A1* | 10/2020 | Fazeli | G06N 3/088 |
| 2021/0112157 | A1* | 4/2021 | Ferguson | H04M 3/568 |
| 2023/0096876 | A1* | 3/2023 | Yu | H04R 3/04 |
| | | | | 704/200 |

FOREIGN PATENT DOCUMENTS

| | | |
|---|---|---|
| CN | 112614502 B | 1/2022 |
| KR | 20150012752 A * | 2/2015 |

OTHER PUBLICATIONS

Carbajal et al., Multiple input neural network based residual echo suppression; 2018; ICASSP 2018 (Year: 2018).*
Westhausen et al., "Acoustic Echo Cancellation With the Dual-Signal Transformation LSTM Network," arXiv:2010.14337v2, Nov. 23, 2020.

* cited by examiner

HETEROGENEOUS COMPUTING FOR HYBRID ACOUSTIC ECHO CANCELLATION

TECHNICAL FIELD

Embodiments of the invention relate to a heterogeneous computing system for acoustic echo cancellation, where the heterogeneous computing system includes both digital signal processing components and artificial intelligence (AI) components.

BACKGROUND

Acoustic echoes occur in audio or video calls when a far-end person's voice is transmitted to the near-end loudspeaker and picked up by the near-end microphone. The coupling between the loudspeaker and the microphone can significantly degrade the quality of voice communication. Reducing acoustic echoes can improve speech intelligibility and quality.

Modern teleconferencing systems perform acoustic echo cancellation to suppress the echo effect. Conventional acoustic echo cancellation is typically based on an adaptive finite impulse response (FIR) filter that continuously adapts to the acoustic path in real-time. The output of the filter is subtracted from the acoustic path signal to produce a signal output with the linear portion of the echoes substantially canceled. However, FIR filters are often unable to remove a nonlinear portion of the echoes.

Therefore, there is a need for an acoustic echo cancellation mechanism that improves the existing techniques to produce a high-quality echo-suppressed signal.

SUMMARY

In one embodiment, a device is provided to perform acoustic echo cancellation. The device includes a speaker to output a far-end signal at the device, a microphone to receive at least a near-end signal and the far-end signal from the speaker to produce a microphone output, and an AI accelerator operative to perform neural network operations according to a first neural network model and a second neural network model to output an echo-suppressed signal. The device further includes a digital signal processing (DSP) unit. The DSP unit is operative to perform adaptive filtering to remove at least a portion of the far-end signal from the microphone output to generate a filtered near-end signal, and perform Fast Fourier Transform (FFT) and inverse FFT (IFFT) to generate input to the first neural network model and the second neural network model, respectively.

In another embodiment, a device including a multi-stage pipeline is provided. The device includes two or more DSP stages to perform adaptive filtering, FFT, and IFFT. The device further includes two or more neural network stages to perform neural network operations according to a first neural network model and a second neural network model. The adaptive filtering removes at least a portion of a far-end signal from a microphone output to generate a filtered near-end signal as input to the FFT. The second neural network model receives an output of the IFFT and generates an echo-suppressed signal.

In yet another embodiment, a method is provided for acoustic echo cancellation. A DSP unit performs adaptive filtering to remove at least a portion of a far-end signal from a microphone output to generate a filtered near-end signal, and performs FFT to compute spectra of the far-end signal and the filtered near-end signal to generate input to a first neural network model. An AI accelerator performs first neural network operations on the spectra according to a first neural network model. The DSP unit further performs IFFT on an output of the first neural network model to generate a time-domain signal as input to a second neural network model. The AI accelerator further performs second neural network operations according to the second neural network model to output an echo-suppressed signal.

Advantages of the invention will be explained in detail in the following description.

BRIEF DESCRIPTION OF THE DRAWINGS

The invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a heterogeneous computing system to perform hybrid acoustic echo cancellation (AEC) operations. The heterogeneous computing system includes digital signal processing (DSP) circuits and neural network circuits. The DSP circuits and the neural network circuits may form a multi-stage pipeline to efficiently perform the hybrid AEC operations. The hybrid AEC operations include DSP operations and neural network operations. The DSP operations may include adaptive filtering, Fast Fourier Transform (FFT), inverse FFT (IFFT), etc. The neural network operations may include convolutions, long short-term memory (LSTM) networks, fully-connected layers, sigmoid activation, layer normalization, etc. The heterogeneous computing architecture disclosed herein not only increases the real-time computing efficiency of AEC operations, but also improves the speech quality in a fully-duplex voice communication system.

Figure 1:
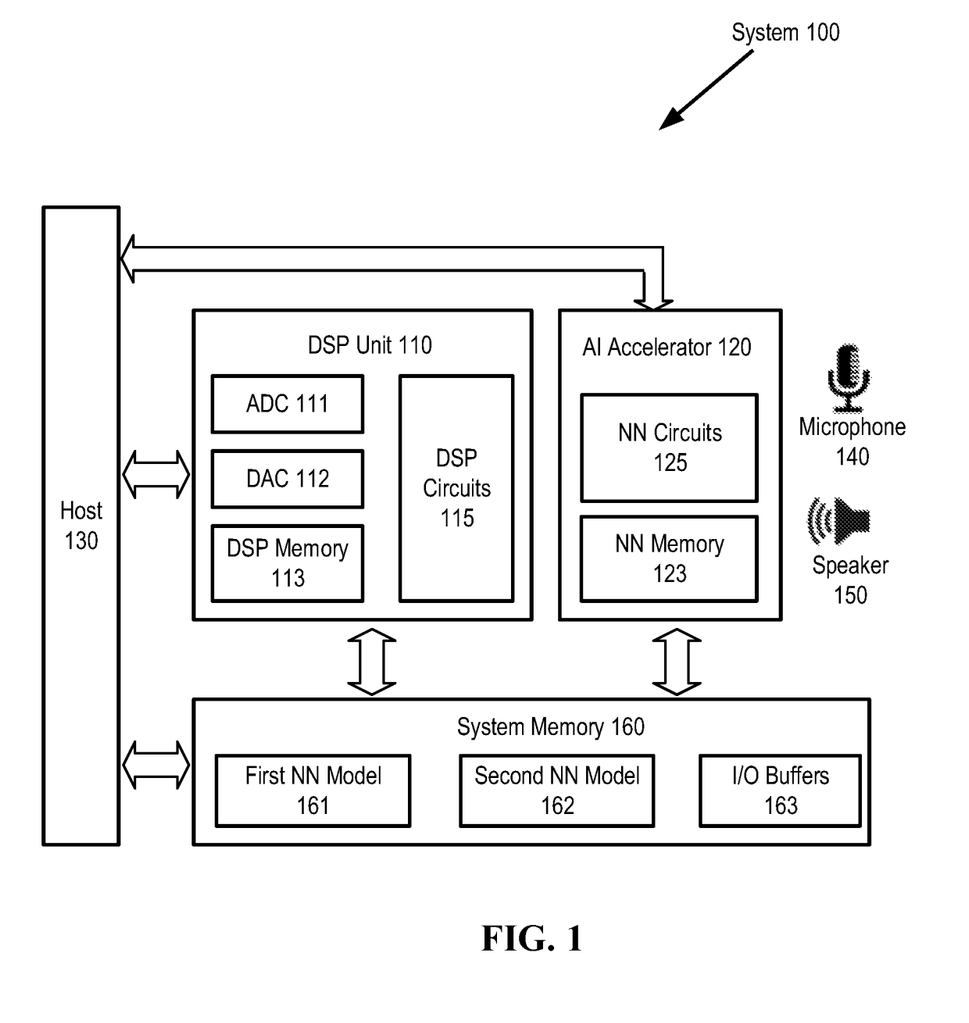
FIG. 1 illustrates a system operative to perform hybrid acoustic echo cancellation (AEC) according to one embodiment.

FIG. 1 illustrates a system 100 operative to perform hybrid AEC operations according to one embodiment. The system 100 includes a DSP unit 110 and an artificial intelligence (AI) accelerator 120. The DSP unit 110 may further include an analog-to-digital converter (ADC) 111, a digital-to-analog converter (DAC) 112, DSP memory 113, and DSP circuits 115. The DSP unit 110 is operative to perform digital processing operations such as adaptive filtering, FFT, IFFT, etc. The AI accelerator 120 may further include neural network (NN) circuits 125 and NN memory 123. The NN circuits 125 are operative to perform neural network operations such as convolutions, LSTM networks, fully-connected layers, sigmoid activation, layer normalization, etc. The DSP circuits 115 and the NN circuits 125 may be programmable circuits and/or fixed-function circuits. The system 100 may be part of a computer, a smartphone, an audio system, a multimedia system, a teleconference system, or any device or system that provides two-way voice communication.

In one embodiment, the system 100 includes a host 130, which may be a controller circuit, a processor (e.g., a central processing unit (CPU), a graphics processing unit (GPU), etc.), or the like, to instruct the DSP unit 110 and the AI accelerator 120 to perform the hybrid AEC operations. The system 100 further includes a microphone 140 to receive sound signals and a speaker 150 (also called a loudspeaker) to generate sound signals. The system 100 further includes a system memory 160; e.g. dynamic random access memory (DRAM) to store, among other things, a first NN model 161, a second NN model 162, and input/output (I/O) buffers 163. The first and second NN models 161 and 162 have been trained to include weights and parameters for echo cancellation. The training may be performed on the system 100, or a server computer that downloads the trained models 161 and 162 to the system 100. The I/O buffers 163 may be used by the DSP unit 110 and/or the AI accelerator 120 to store intermediate results.

Figure 2:
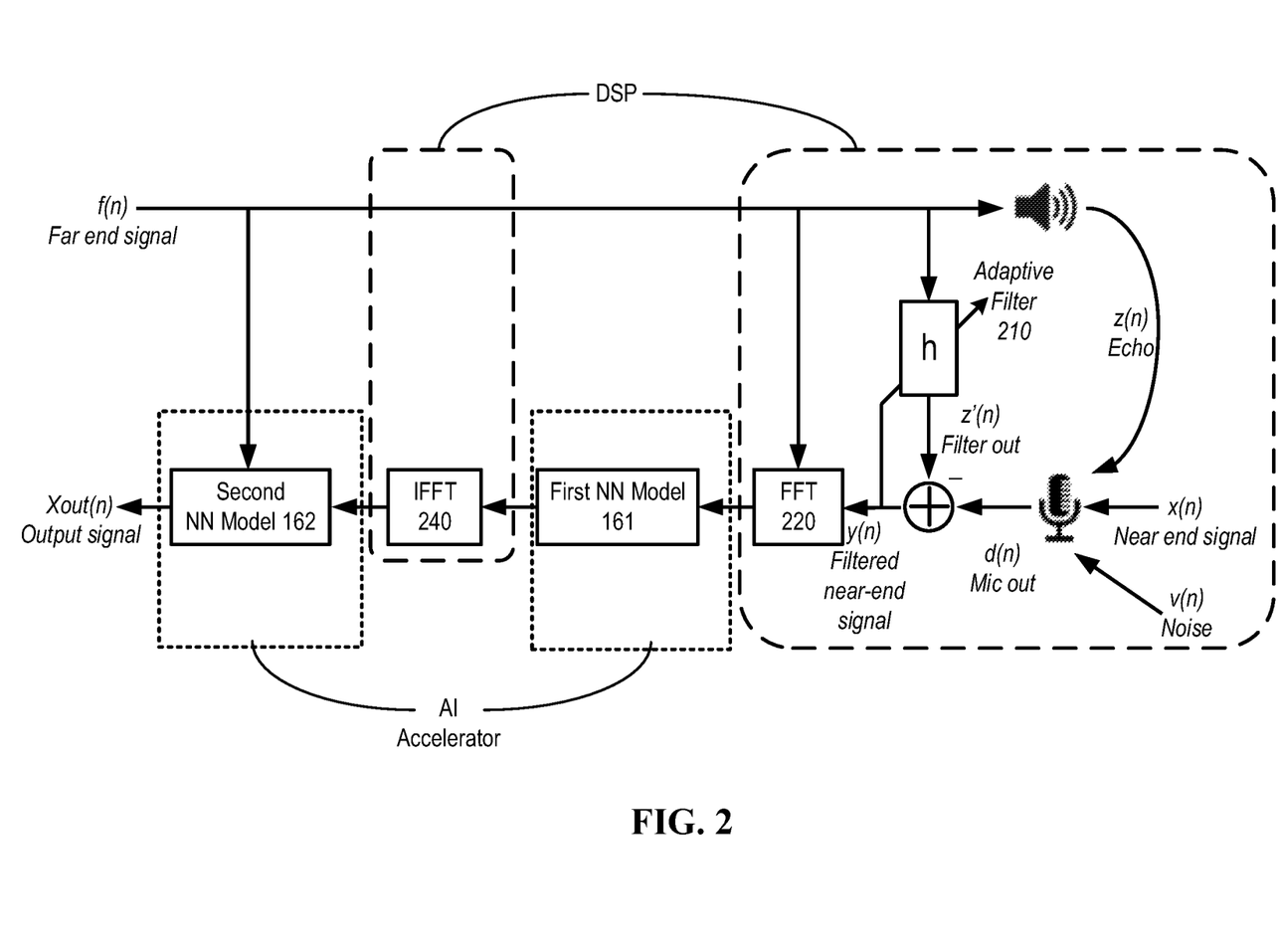
FIG. 2 illustrates hybrid AEC operations according to one embodiment.

FIG. 2 illustrates the hybrid AEC operations performed by the system 100 according to one embodiment. The microphone output d(n), which includes the echo z(n) of a far-end signal f(n), the near-end signal x(n), and the background noise v(n), can be expressed as:

$$d(n)=z(n)+x(n)+v(n). \quad (1)$$

The adaptive filter 210 can be expressed as a filter response function h(n) applied to the far-end signal f(n). The adaptive filter 210 may be a Least Mean Squares (LMS) filter, a normalized LMS filter, an adaptive Kalman filter, or any other adaptive filter. The filter output z'(n) can be expressed as:

$$z'(n)=h(n)*f(n) \quad (2)$$

where * represents a convolution operation.

The filtered near-end signal y(n) is computed by subtracting the filter output z'(n) from the microphone output d(n):

$$y(n)=d(n)-z'(n). \quad (3)$$

Thus, the adaptive filter 210 removes at least a portion of the far-end signal f(n) from the microphone output d(n) to generate the filtered near-end signal y(n). The far-end signal f(n) and the filtered near-end signal y(n) are the input signals to the subsequent operations, including: FFT 220, operations according to the first NN model 161, IFFT 240, and operations according to the second NN model 162. Both FFT 220 and the second NN model 162 receive the far-end signal f(n) as input. The output signal Xout(n) is the echo-suppressed signal.

In one embodiment, the DSP unit 110 is assigned to perform the adaptive filter 210, FFT 220, and IFFT 240. The AI accelerator 120 is assigned to perform NN operations according to the first NN model 161 and the second NN model 162. The DSP unit 110 and the AI accelerator 120 may include specialized circuitry and/or implement respective instruction set architecture that can speed up the execution of these assigned operations.

Figure 3:
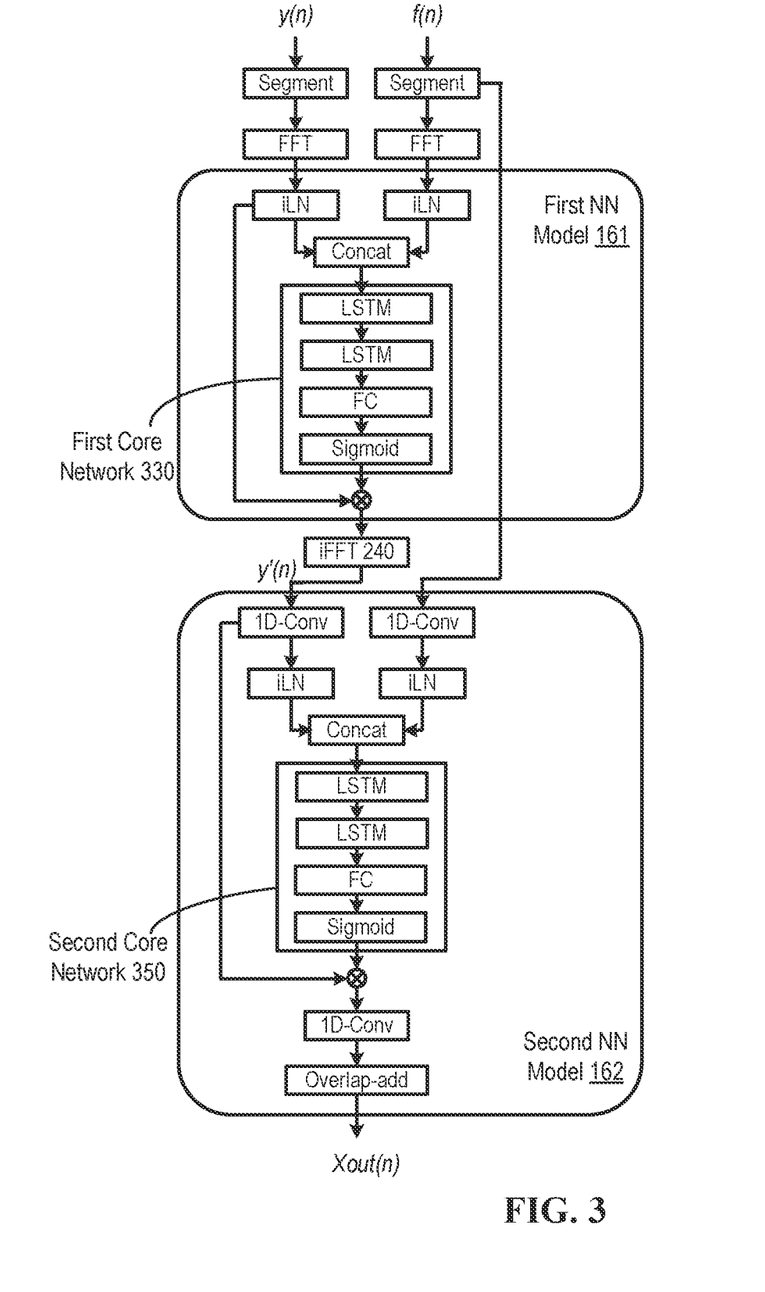
FIG. 3 is a diagram illustrating two neural network models according to one embodiment.

FIG. 3 is a diagram illustrating the first NN model 161 and the second NN model 162 according to one embodiment. The first NN model 161 and the second NN model 162 together form a dual-signal transformation long short term memory (LSTM) network (DTLN).

The first NN model 161 includes a first core network 330, which further includes two LSTM layers, a fully-connected (FC) layer, and sigmoid activation. The first core network 330 receives normalized and concatenated spectra of two input signals, where the input signals are the filtered near-end signal y(n) and the far-end signal f(n).

The spectrum of each input signal is computed by short-time Fourier transformation (STFT), which includes segmentation of the input signal followed by FFT. After the FFT, each input signal is individually normalized by instant layer normalization (iLN), and the outputs of the iLNs are concatenated.

The first core network 330 predicts a time-frequency mask which is multiplied with the unnormalized magnitude of STFT of the filtered near-end signal y(n). The output of the first NN model 161 is transformed back to a time-domain signal y'(n) by IFFT.

The second NN model 162 includes a second core network 350, which further includes two LSTM layers, a fully-connected (FC) layer, and sigmoid activation. The second NN model 162 receives the segmented far-end signal f(n) and the time-domain signal y'(n), and creates learned feature representations of the two signals using respective 1D convolution layers. The same weights are applied in the respective 1D convolution layers but the normalization with iLN is performed individually to enable a separate scaling and bias for each feature representation. The second core network 350 receives the normalized and concatenated feature representations and produces a predicted mask. The predicted mask of the second core network 350 is multiplied with the unnormalized feature representation y'(n) after the 1D convolution. The multiplication output is transformed back to the time domain with a 1D convolution. For reconstructing the continuous-time signal an overlap-add procedure may be used.

Figure 4:
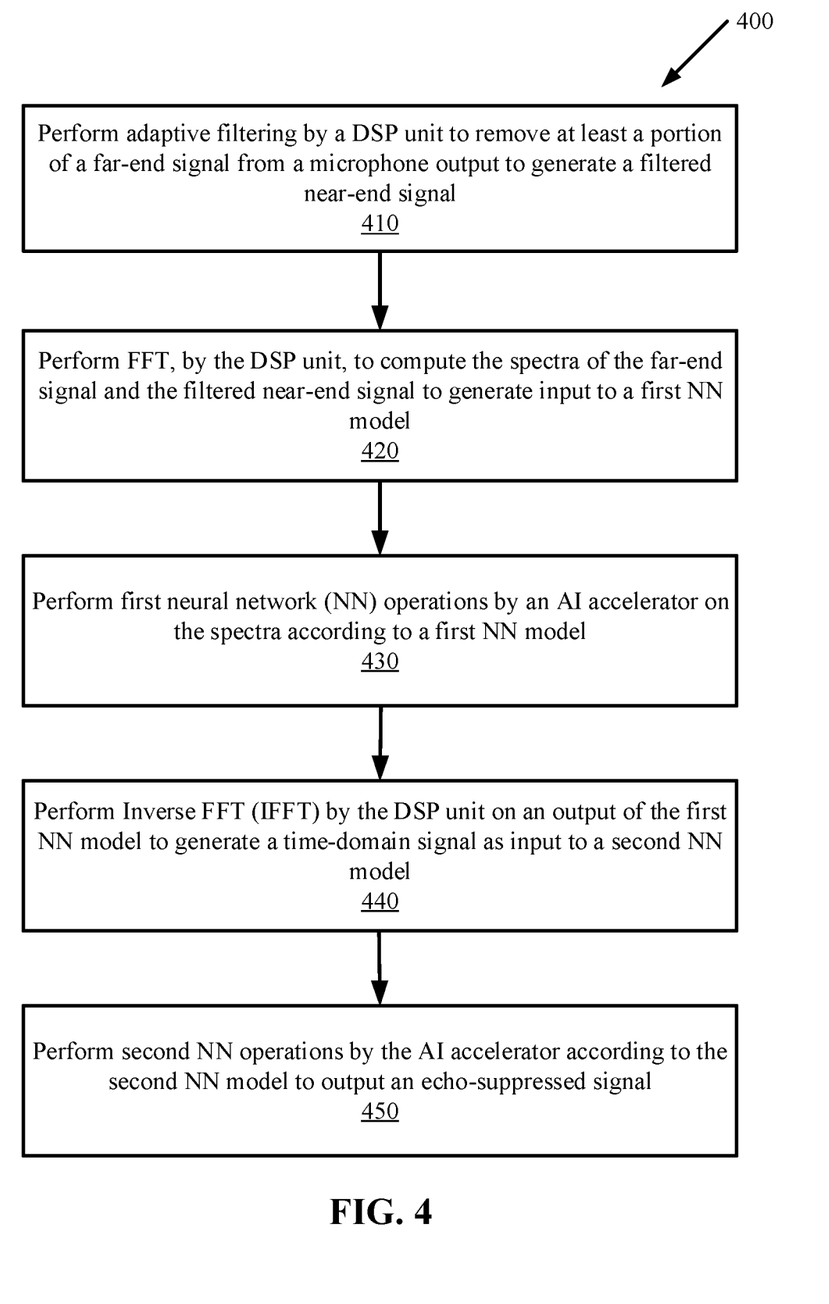
FIG. 4 is a flow diagram illustrating a method for hybrid AEC according to one embodiment.

FIG. 4 is a flow diagram illustrating a method 400 for hybrid acoustic echo cancellation according to one embodiment. Method 400 may be performed by a system, such as the system 100 in FIG. 1, a system 5 in FIG. 5, or any system that has DSP and AI processing capabilities.

At step 410, a DSP unit in the system performs adaptive filtering to remove at least a portion of a far-end signal from a microphone output to generate a filtered near-end signal. At step 420, the DSP unit performs FFT to compute the spectra of the far-end signal and the filtered near-end signal to generate input to a first neural network (NN) model. At step 430, an AI accelerator in the system performs first neural network operations on the spectra according to a first NN model. At step 440, the DSP unit performs IFFT on an output of the first NN model to generate a time-domain signal as input to a second NN model. At step 450, the AI accelerator performs second NN operations according to the second NN model to generate an echo-suppressed signal.

In one embodiment, the first NN operations are performed according to the first NN model on a normalized spectrum of the far-end signal concatenated with a normalized spectrum of the filtered near-end signal. The second NN operations are performed according to the second NN model on a segmented far-end signal and an output of the IFFT. In one embodiment, the adaptive filtering, the FFT, the first NN model, the IFFT, the second NN model are performed in a multi-stage pipeline. In one embodiment, the FFT is a short-time Fourier transformation (STFT).

Figure 5:
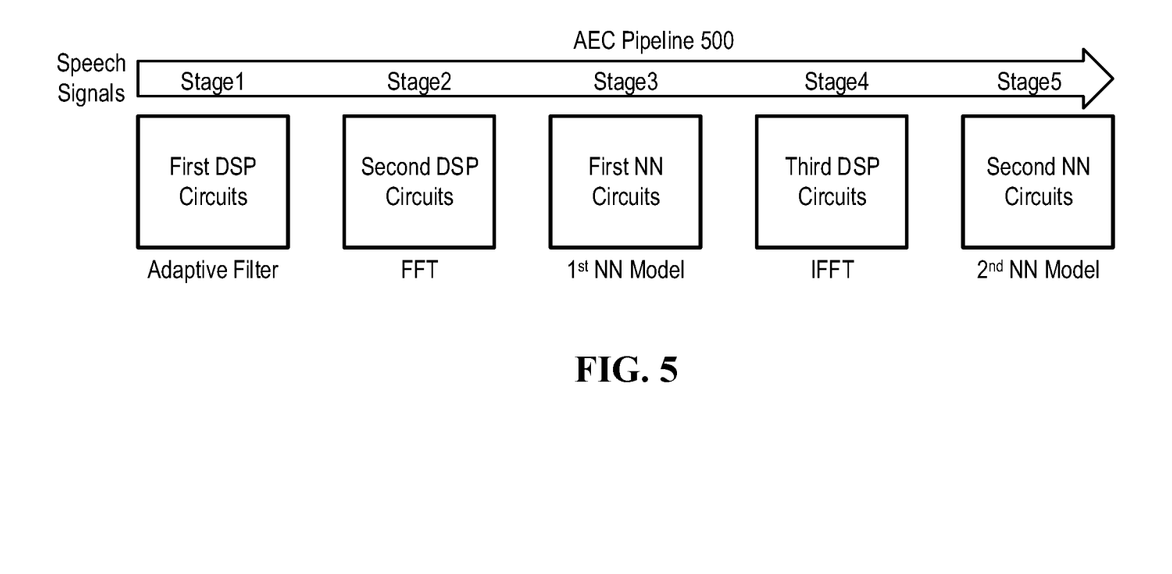
FIG. 5 is a diagram of an AEC pipeline according to one embodiment.

FIG. 5 is a diagram of an AEC pipeline 500 according to one embodiment. The AEC pipeline 500 may be part of the system 100 in FIG. 1. The AEC pipeline 500 includes five stages. Stage 1 is the adaptive filtering stage, stage 2 is the FFT stage, stage 3 is the first NN model stage, stage 4 is the IFFT stage, and stage 5 is the second NN model stage. Stages 1, 2, and 4 are the DSP stages, and stages 3 and 5 are the NN stages. The AEC pipeline 500 includes hardware circuits for each of the pipeline stages, such that all of the pipeline stages can execute in parallel.

In another embodiment, some of the stages may be merged into one stage, or some of the stages may be split into multiple stages. For example, an AEC pipeline may include two or more digital signal processing stages to perform adaptive filtering, FFT, and IFFT; and two or more neural network stages to perform neural network operations according to the first NN model and the second NN model. The adaptive filtering removes at least a portion of a far-end signal from a microphone output to generate a filtered near-end signal as input to the FFT. The FFT computes the spectra of the far-end signal and the filtered near-end signal to generate input to the first NN model. The first NN model operates on a normalized spectrum of the far-end signal concatenated with a normalized spectrum of the filtered near-end signal. The IFFT operates on an output of the first NN model to generate a time-domain signal as input to the second NN model. The second NN model operates on a segmented far-end signal and an output of the IFFT to generate an echo-suppressed signal.

Various functional components, units, or blocks have been described herein. As will be appreciated by persons skilled in the art, the functional blocks will preferably be implemented through circuits (either dedicated circuits or general-purpose circuits, which operate under the control of one or more processors and coded instructions), which will typically comprise transistors that are configured in such a way as to control the operation of the circuitry in accordance with the functions and operations described herein.

The operations of the flow diagram of FIG. 4 have been described with reference to the exemplary embodiments of FIGS. 1 and 5. However, it should be understood that the operations of the flow diagram of FIG. 4 can be performed by embodiments of the invention other than those discussed with reference to FIGS. 1 and 5, and the embodiments discussed with reference to FIGS. 1 and 5 can perform operations different than those discussed with reference to the flow diagram. While the flow diagram of FIG. 4 shows a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A device operative to perform acoustic echo cancellation, comprising:
a speaker to output a far-end signal at the device;
a microphone to receive at least a near-end signal and the far-end signal from the speaker to produce a microphone output;
an artificial intelligence (AI) accelerator operative to perform neural network (NN) operations according to a first NN model and a second NN model to output an echo-suppressed signal; and
a digital signal processing (DSP) unit operative to:
perform adaptive filtering to remove at least a portion of the far-end signal from the microphone output to generate a filtered near-end signal; and
perform Fast Fourier Transform (FFT) and inverse FFT (IFFT) to generate input to the first NN model and the second NN model, respectively.

2. The device of claim 1, wherein the DSP unit in performing the FFT is further operative to:
compute spectra of the far-end signal and the filtered near-end signal to generate input to the first NN model.

3. The device of claim 1, wherein the DSP unit in performing the IFFT is further operative to:
perform the IFFT on an output of the first NN model to generate a time-domain signal as input to the second NN model.

4. The device of claim 1, further comprising:
a pipeline including:
two or more DSP stages to perform the adaptive filtering, the FFT, and the IFFT; and
two or more NN stages to perform the NN operations according to the first NN model and the second NN model.

5. The device of claim 1, further comprising:
a 5-stage pipeline including:
a first DSP circuit to perform the adaptive filtering;
a second DSP circuit to perform the FFT;
a first NN circuit to operate according to the first NN model;
a third DSP circuit to perform the IFFT; and
a second NN circuit to operate according to the second NN model.

6. The device of claim 1, wherein the far-end signal is input to the FFT and the second NN model.

7. The device of claim 1, wherein the AI accelerator is operative to perform operations according to the first NN model on a normalized spectrum of the far-end signal concatenated with a normalized spectrum of the filtered near-end signal.

8. The device of claim 1, wherein the AI accelerator is operative to perform operations according to the second NN model on a segmented far-end signal and an output of the IFFT.

9. The device of claim 1, wherein the FFT is a short-time Fourier transformation (STFT).

10. The device of claim 1, wherein both the first NN model and the second NN model each includes two layers of long short term memory (LSTM), a fully-connected layer, and sigmoid activation.

11. A device including a multi-stage pipeline comprising:
two or more digital signal processing (DSP) stages to perform adaptive filtering, Fast Fourier Transform (FFT), and inverse FFT (IFFT); and two or more neural network stages to perform neural network operations according to a first NN model and a second NN model,
wherein the adaptive filtering removes at least a portion of a far-end signal from a microphone output to generate a filtered near-end signal as input to the FFT, and
wherein the second NN model receives an output of the IFFT and generates an echo-suppressed signal.

12. The device of claim 11, wherein the multi-stage pipeline further comprises:
a first DSP circuit to perform the adaptive filtering;
a second DSP circuit to perform the FFT to compute spectra of the far-end signal and the filtered near-end signal to generate input to the first NN model;
a first NN circuit to operate on the spectra according to the first NN model;
a third DSP circuit to perform the IFFT on an output of the first NN model to generate a time-domain signal as input to the second NN model; and
a second NN circuit to operate according to the second NN model.

13. The device of claim 11, wherein one of the neural network stages is operative to perform operations according to the first NN model on a normalized spectrum of the far-end signal concatenated with a normalized spectrum of the filtered near-end signal.

14. The device of claim 11, wherein one of the neural network stages is operative to perform operations according to the second NN model on a segmented far-end signal and the output of the IFFT.

15. The device of claim 11, wherein the FFT is a short-time Fourier transformation (STFT).

16. The device of claim 11, wherein both the first NN model and the second NN model each includes two layers of long short term memory (LSTM), a fully-connected layer, and sigmoid activation.

17. A method for acoustic echo cancellation, comprising:
performing adaptive filtering by a digital signal processing (DSP) unit to remove at least a portion of a far-end signal from a microphone output to generate a filtered near-end signal;
performing, by the DSP unit, Fast Fourier Transform (FFT) to compute spectra of the far-end signal and the filtered near-end signal to generate input to a first neural network (NN) model;
performing first NN operations by an artificial intelligence (AI) accelerator on the spectra according to a first NN model;
performing inverse FFT (IFFT) by the DSP unit on an output of the first NN model to generate a time-domain signal as input to a second NN model; and
performing second NN operations by the AI accelerator according to the second NN model to output an echo-suppressed signal.

18. The method of claim 17, wherein performing the first NN operations further comprises:
performing the first NN operation according to the first NN model on a normalized spectrum of the far-end signal concatenated with a normalized spectrum of the filtered near-end signal.

19. The method of claim 17, wherein performing the second NN operations further comprises:
performing the second NN operations according to the second NN model on a segmented far-end signal and an output of the IFFT.

20. The method of claim 17, wherein the adaptive filtering, the FFT, the first NN model, the IFFT, the second NN model are performed in a multi-stage pipeline.

* * * * *